(12) United States Patent
Harris

(10) Patent No.: US 7,200,776 B2
(45) Date of Patent: Apr. 3, 2007

(54) SYSTEM AND METHOD FOR GENERATING TRACE DATA IN A COMPUTING SYSTEM

(75) Inventor: Jeremy G Harris, Buckinghamshire (GB)

(73) Assignee: Sun Microsystems, Inc., Santa Clara, CA (US)

( * ) Notice: Subject to any disclaimer, the term of this patent is extended or adjusted under 35 U.S.C. 154(b) by 545 days.

(21) Appl. No.: 10/300,144

(22) Filed: Nov. 20, 2002

(65) Prior Publication Data

US 2003/0120980 A1   Jun. 26, 2003

(30) Foreign Application Priority Data

Dec. 20, 2001 (GB) .................................. 0130484.9

(51) Int. Cl.
*G06F 11/00* (2006.01)
(52) U.S. Cl. .................... 714/45; 714/719; 714/27; 714/30; 714/37
(58) Field of Classification Search ................ 714/39, 714/45
See application file for complete search history.

(56) References Cited

U.S. PATENT DOCUMENTS

| 5,642,478 | A |   | 6/1997 | Chen et al. ................... 714/45 |
| 5,754,827 | A |   | 5/1998 | Barbier et al. ................ 703/14 |
| 5,799,022 | A |   | 8/1998 | Williams ..................... 714/797 |
| 5,884,023 | A | * | 3/1999 | Swoboda et al. ............. 714/30 |
| 6,178,525 | B1 | * | 1/2001 | Warren ......................... 714/37 |
| 6,457,144 | B1 | * | 9/2002 | Eberhard ...................... 714/45 |
| 6,530,047 | B1 | * | 3/2003 | Edwards et al. ............. 714/724 |
| 6,738,885 | B1 | * | 5/2004 | Zhang et al. ................ 711/173 |
| 6,766,511 | B1 | * | 7/2004 | Berry et al. ................. 717/128 |
| 6,854,029 | B2 | * | 2/2005 | Davis .......................... 710/100 |
| 6,904,473 | B1 | * | 6/2005 | Bloxham et al. ............. 710/22 |
| 6,918,065 | B1 | * | 7/2005 | Edwards et al. ............. 714/45 |
| 2006/0117229 | A1 | * | 6/2006 | Swaine et al. ................ 714/45 |

OTHER PUBLICATIONS

International search report application No. GB0130484.9 mailed Jul. 8, 2002.
"A Performance Methodology for Commercial Servers", Kunkel, et al, IBM J. Res. Develop., vol. 44, No. 6, Nov. 2000.

* cited by examiner

*Primary Examiner*—Robert Beausoliel
*Assistant Examiner*—Christopher McCarthy
(74) *Attorney, Agent, or Firm*—Meyertons Hood Kivlin Kowert & Goetzel, P.C.; Rory D. Rankin; B. Noel Kivlin

(57) ABSTRACT

A hardware trace unit is integrated into a computer system that has a main memory. The trace unit includes registers that contain information defining a location in main memory, and has an input connection. This is used to eavesdrop on communications in the computer system, thereby obtaining information about the state and/or operation of the system. A trigger mechanism then compares the information received against one or more trigger conditions, such as whether a particular event has occurred. Responsive to the trigger conditions being satisfied, the trace unit generates an output record containing diagnostic information. This is sent for storage in the main memory of the computer at the location defined in the registers.

42 Claims, 4 Drawing Sheets

SYSTEM AND METHOD FOR GENERATING TRACE DATA IN A COMPUTING SYSTEM

FIELD OF THE INVENTION

The present invention relates to the acquisition of trace or diagnostic information for monitoring the operation and performance of a computer system.

BACKGROUND OF THE INVENTION

The complexity of modern computer systems is such that it can be very difficult for designers to fully understand every detail of the operation, and in particular the full interaction of all the different hardware components. Note that such components may be physically separate devices, or logically separate portions of a single device (for example, a specific functional area on a processor or other semiconductor device). Nevertheless, such an understanding is important if the performance of the system is to be improved or if any potentially erroneous behaviour is to be corrected.

One particular area of interest is how the system operates for a "real-life" application. Thus although the basic operation of individual hardware components might be known, a large-scale program may conceivably utilise a vast number of operational sequences for any given device, and generate a huge number of interactions between the different devices. It can be very difficult to predict on a purely abstract basis which particular sequences or interactions will be most utilised in practice.

It is extremely desirable to provide a designer with this missing information. This helps to identify those hardware operations that are performed most frequently, that represent potential bottlenecks, or that are otherwise the most important for performance of a typical software application. The designer can then focus on addressing those particular aspects that are most likely to generate significant benefits from the perspective of a system user or customer. This process is described in: "A Performance Methodology for Commercial Servers" by Kunkel et al., p851–872, in the IBM Journal of Research and Development, Volume 44, No. 6, November 2000.

Certain tools are available to assist designers in understanding the behaviour and operation of computer systems. One known form of tool is a software simulator. This represents a program (or suite of programs) which emulates the behaviour of a hardware system. More particularly the software mimics the behaviour of the individual registers, comparators, and other hardware devices, thereby providing an indication of how the corresponding hardware system as a whole would (or does) operate.

The software emulator can be instrumented or otherwise designed to output information that is of use to the designer concerning the performance of the system. Such information will typically include the number of operations performed by a given component and the result of those operations; the input into a component and the output from a component. Thus in general, a software emulator can be configured to provide any desired level of detail about (simulated) system performance.

However, although software emulators are very powerful in terms of functionality, they suffer from two significant drawbacks. The first is that they can be difficult and time consuming to develop. In this respect they represent an additional expense over and above the cost of producing the new hardware itself. This is particularly the case if the software emulator would not otherwise be required for the hardware development, or if the analysis to be performed is for existing hardware, for which no emulator is currently available. Moreover, a software emulator tends to represent an all-or-nothing approach. In other words, if a problem is known or suspected to exist purely in relation to one particular hardware component, it can be difficult to construct a simulator simply for this one component. Rather, it may be necessary to develop a software emulator for the entire system in order to properly investigate just this one component.

A second drawback is that the operation of a software emulator is much slower than the corresponding hardware (which is of course why machines are implemented in hardware rather than in software). This can make it a lengthy and time-consuming process to obtain the results required for proper analysis of the hardware system. In addition, it can make it difficult to properly test a typical real-life application, if this is a program that needs to operate in real-time or has some other form of time dependency.

Rather than using a full software simulation of each individual component (i.e. a complete bottom-up approach), it is also possible to utilise a more generic, high-level simulator, which is generally quicker and cheaper to develop. The modelling of such a simulator can be based on an extrapolation of observed system behaviour in known circumstances.

Consequently, it is important to collect good input data for such a (lightweight) simulator. This is often done by running tracing software, which traps particular operations of interest (e.g. branches or memory accesses). However, a large amount of trace information is needed for an accurate simulation, so that the cost of the traps to collect this data may be significant. This can then degrade the overall system performance, which in turn may adversely impact the reliability of the collected data for simulation purposes.

In addition, there are generally limitations on the type of information that is available to the tracing software. Thus some details of the hardware operation may simply not be accessible to higher level software. Consequently, it may not be possible in all situations to provide the simulator with the necessary (or sufficiently accurate) information to obtain reliable results.

A variety of hardware-based approaches are also available for obtaining diagnostic and/or performance data. One known possibility is to use event counters, which constitute special purpose registers that store limited information. In particular, event counters are used to generate a count illustrating the number of times that a particular operation has been performed or a particular circumstance has arisen. For example a register may be used to record the number of reads into a device or the number of interrupts received by a processor.

An advantage of using event counters is that they add very little overhead to the operation of the hardware system and so do not impact overall system performance. They can thus be used on a system working substantially in real time. A further benefit is their flexibility, in that event counters can be added incrementally if desired to an existing system in order to investigate particular aspects of operation. This more focussed, granular, approach aids cost-effectiveness.

On the other hand, the information that can be derived from event counters is very limited due to the minimal amount of information that they record. For example, they do not provide the designer with specific details of information flow, or the sequence of different types of events. This in turn restricts their usefulness as a system design tool.

Another known hardware device that addresses some of the limitations of event counters is an embedded logic analyser, as described for example in U.S. Pat. No. 5,799,022. This is a hardware module that can intercept data of interest for diagnostic purposes. The intercepted data is then stored in specially provided memory within the module itself. Although an embedded logic analyser is flexible in terms of the type of information that can be recorded, it has a relatively limited amount of memory for storing data, and it can also be rather complicated to try to pass the diagnostic data collected by the logic analyser through to real-time system monitoring software. Note that some logic analysers come in the form of plug-in modules, which can then be added to or removed from the a as required. However, there may well be certain parts of the hardware system that are simply not accessible to connection with an external plug-in module.

It is also known to use in-circuit emulators. These are special-purpose hardware devices such as processors, which emulate the behaviour of a standard device at the same time as outputting diagnostic information. This allows them to be utilised in a complete system as a replacement for the standard (emulated) device, with the diagnostic information then being provided at dedicated hardware ports. In-circuit emulators are generally used for testing in laboratory situations, since their performance and/or cost can be markedly different from the standard device. Consequently, they are not generally suitable for shipping in products.

In summary, although a number of mechanisms are presently available for obtaining trace or diagnostic information about system performance, whether actual or simulated, it will be appreciated that these current approaches suffer from various limitations, as hitherto described.

SUMMARY OF THE INVENTION

In accordance with the present invention there is provided a hardware trace unit integrated into a computer system having a main memory. The trace unit includes a store containing information specifying an output location in main memory, and an input for monitoring the state and/or operation of the computer system. A trigger unit is used to compare data from the input against one or more trigger conditions, and an output generator responds to one or more trigger conditions being satisfied to write diagnostic information to the main memory of the computer at the output location specified in the store.

Such a trace unit provides a convenient and flexible mechanism for obtaining diagnostic information about the performance of the computer system. More particularly, the trace unit is integrated into the computer system in the sense that it exploits the main memory of the computer system for output purposes, thereby avoiding the need to contain its own memory support.

Note that the trace unit may be formed as an individual hardware component in its own right, or may be fabricated as one logical unit within a larger device (such as a processor). Furthermore, the structures within the trace unit, such as the trigger unit and/or the output generator, may be combined or split according to particular design requirements, without adversely affecting the overall functionality of the device. In addition, although the trace unit is described as hardware, it will be understood that this only indicates that it comprises additional hardware components over and above those that would otherwise be present in the computer system. There may of course be firmware, microcode or other software present and operational in a trace unit.

The monitoring of the trace unit is generally performed passively, in the sense that the input data is typically acquired by tapping or eavesdropping on existing lines in the computer. Consequently, diagnostic data can be collected with a minimal impact on system behaviour. This makes it feasible to have multiple trace units in the computer system at various locations of interest, especially since such a trace unit can be a relatively lightweight device. Moreover, trace units can be added or removed substantially as required, thereby providing great flexibility and cost control over the diagnostic process.

In one particular embodiment, the store comprises a register for storing said location in main memory. This register is incremented after each output to main memory, so that new diagnostic data does not overwrite previous data. However, the output of diagnostic information is disabled if the output location is not within a predetermined range. This ensures that the diagnostic information does not encroach onto memory regions allocated to other processes or devices. In this embodiment, the operating system of the computer can configure both the predetermined range and also the initial start value of the register (typically at the lowest address of the predetermined range). This facility is particularly useful if multiple trace units are present in the computer system, since the operating system can then ensure that all their outputs can be properly accommodated in memory without overlap.

In order for the trace unit to output to main memory, a suitable link or connection is provided. In one embodiment, this is accomplished by attaching the output generator to a line or path connected to a cache of the computer system, while another possibility is that the output generator is attached to a bus for DMA transfer with the main memory. Note that once the trace unit has injected its diagnostic information into the system memory hierarchy, it is then handled in the same way as any normal memory traffic.

In one embodiment, the diagnostic information includes an indicator showing that it has been generated by a trace unit. One purpose of this is in case a separate trace unit is monitoring memory traffic. In such circumstances, memory traffic generated by trace units may not be of interest for diagnostic purposes. Accordingly, the trigger conditions can then be set to ignore any communications that include such an indicator.

The diagnostic information may include an identifier of the trace unit which generated it. This allows the source of the diagnostic information when stored in memory to be determined, and is particularly useful if the computer system includes multiple trace units. On the other hand, in a different implementation, a single identifier of a trace unit could be written into memory at the start of the region allocated to that trace unit (either by the trace unit itself or by the operating system). This would then allow all subsequent diagnostic information in that memory region to be properly associated with its source trace unit. A further alternative would be for the operating system to maintain a separate file or data structure that records which memory region has been allocated to which trace unit.

Typically the input data comprises a first set of information for comparison against the one or more trigger conditions, and a second set of information which is used by the output generator to form the diagnostic information. For example, if it is desired to monitor commands to a particular address, the first set of information could represent the target address of all received commands, while the second set of information represents the command itself. This can be effectively implemented by having the first set of information received directly into the trigger unit, and the second set of information received directly into the output generator.

On the other hand, the input data used for trigger purposes may form part (or indeed all) of the output diagnostic information. For example, the trace unit may monitor a particular command being sent to a range of addresses. In this case the command and address would be used for triggering purposes, while the diagnostic information may simply be that particular address (within the range) that is receiving the command.

It will be appreciated that it may be desirable to give the operating system or other supervisory software increased control over the operation of the trace unit. For example, there may be a mechanism to permit the selective enablement and disablement of the trace unit. By switching the trace unit off when it is not particularly required, any adverse impact of the trace unit on system performance (e.g. due to increased memory traffic) can be almost completely eliminated. This is particularly beneficial if there are multiple trace units. It is then possible to target the diagnostic investigation to those aspects of system behaviour that are of particular interest at any one time (perhaps due to a suspected fault).

Some embodiments may also allow the operating system to configure the one or more trigger conditions, possibly dependent on the nature of the trigger condition itself. For example, if the trigger condition requires monitoring commands to a particular address range, then it is reasonably straightforward to make this address range configurable. On the other hand, if the trigger condition is a cache miss from a particular cache, then there may be little point in making this configurable.

It will be appreciated that the format and contents of the diagnostic information being output may also be potentially configurable. Once again, the usefulness of this will vary according to circumstances (in particular, the details of the diagnostic information available to the trace unit).

In accordance with another aspect of the invention there is provided a computer system including at least one trace unit such as described above. Diagnostic software can be run on the computer, for example a trace utility program, to access and analyse the diagnostic information output from the trace unit. Note that because the diagnostic information is written from the trace unit into main memory, rather than being stored locally, it is readily accessible to any debugging applications and the like that are supported by the computer system.

In accordance with another aspect of the invention there is provided a processor for use in a computer system including a main memory. The processor includes a distributed trace unit comprising a data generation portion and a data record portion. The data generation portion includes an input for monitoring the state and/or operation of the computer system and a trigger unit that compares data from the input against one or more trigger conditions. An output generator is then responsive to the trigger conditions being satisfied to send diagnostic information to the data record portion. The data record portion includes a store containing information specifying an output location in main memory, and an output for writing the diagnostic information sent by the data generation portion to the main memory of the computer at the output location specified in the store.

In this embodiment, multiple data generation portions can share a single data record portion. One consequence of this is that the diagnostic information from the different data generation portions can then all be stored at a single region in main memory. Not only does this lead to the efficient use of storage space, but it also makes it easier for any diagnostic programs to locate and access the output information. Note also that the ordering in storage will generally preserve the relative sequence (i.e. time ordering) of events from different sources. Again, this is convenient for subsequent analysis. In addition, the diagnostic information sent from an output generator to a data record portion typically includes an indicator of the data generator portion from which it originated.

It will be appreciated that such a distributed trace unit is not limited to use within a processor. Rather, this approach can also be extended to embodiments where the data generation portion(s) and/or the data record portion(s) are not located on the processor itself, but elsewhere in the computer system.

In accordance with a further aspect of the invention, there is provided a method of obtaining diagnostic information for a computer system having a main memory from a hardware trace unit integrated into the computer system. The method involves storing information specifying an output location in main memory, and monitoring data about the state and/or operation of the computer system. The received data can then be compared against one or more trigger conditions, and responsive to one or more trigger conditions being satisfied, diagnostic information can be written to the main memory of the computer at the specified output location.

It will be appreciated that this method will generally benefit from the same features as the hardware trace unit of the invention.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1:
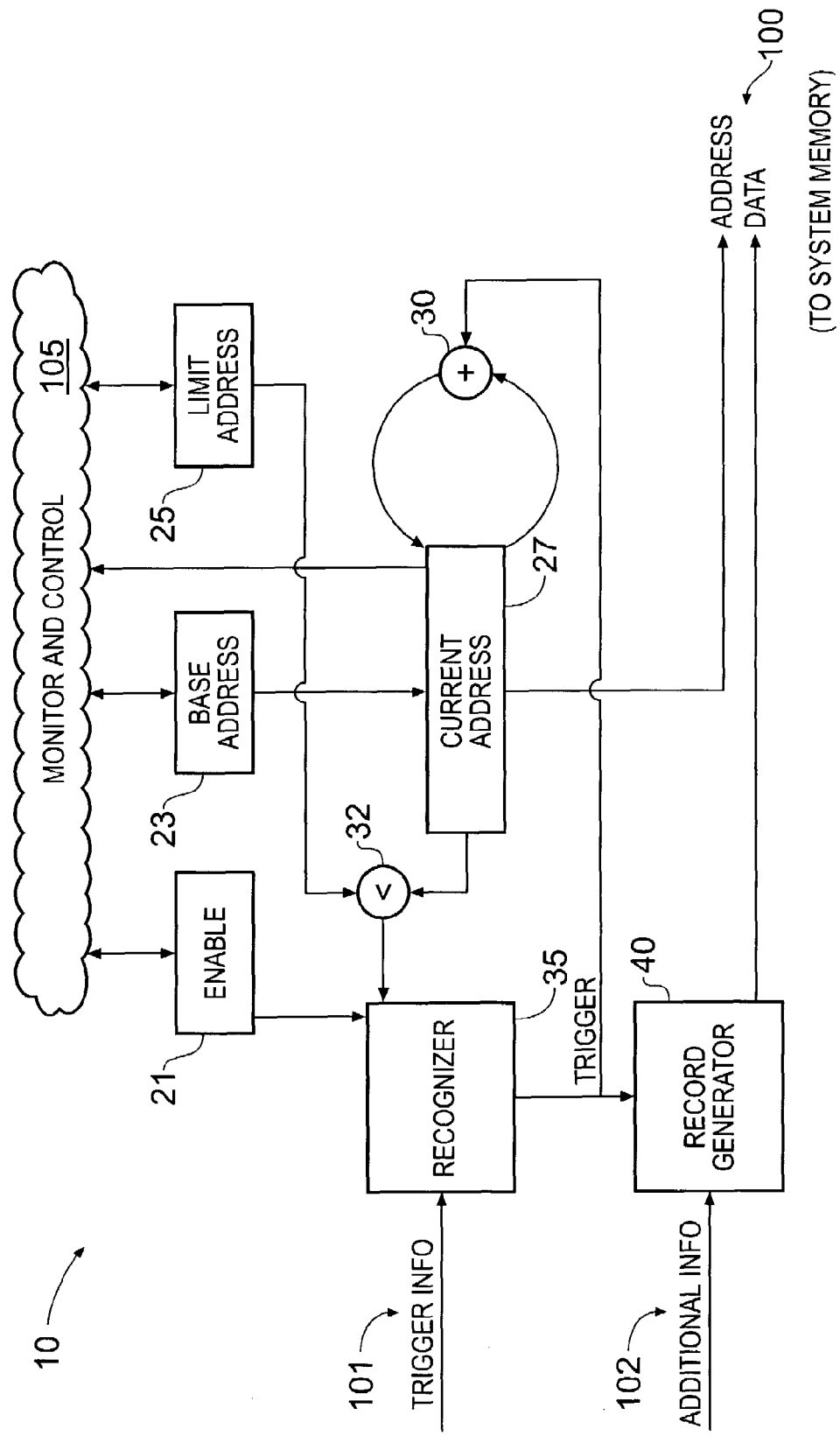
FIG. 1 is a block diagram of a trace unit in accordance with one particular embodiment of the present invention.

FIG. 1 illustrates a trace unit 10 in accordance with one particular embodiment of the present invention. The trace unit serves to intercept desired diagnostic information and to write this information out to main memory, as will now be described.

As shown in FIG. 1, trace unit 10 includes two address storage registers. The first of these registers 23 is used for storing a base address. The second register 25 is used for storing a limit or end address. Together, these two registers 23, 25 define a region of system memory into which the trace unit will output diagnostic information. (It will be appreciated that this memory region could also be defined by storing its base address and size, rather than the base address and end address).

In operation, the desired values for the base address and limit address are written into register 23 and register 25 respectively by the monitor and control system 105. The base and limit addresses stored in registers 23 and 25 may also be made accessible for read-out by monitor and control system 105, or possibly some other external program or utility. Such a facility is particularly useful in a test environment, if the hardware and/or software is not yet fully stable or is otherwise unreliable. In these circumstances, it can be helpful to be able to identify directly from registers 23 and 35 where in memory the diagnostic information has been (is being) stored.

The monitor and control system 105 is shown in FIG. 1 within a cloud, to indicate that it is not part of the trace unit 10 itself. Rather it comprises some external combination of hardware and software, the details of which will be dependent on the particular situation and circumstances of trace unit 10. Typically the software portion is part of the operating system of the computer, and this can then be used to configure the trace unit 10, although a special-purpose utility or diagnostic program could be used instead. The precise hardware mechanism for writing to the registers 23 and 25 and the other components shown in FIG. 1 will vary according to the particular location of the trace unit 10 (e.g. within a processor, attached to a system bus, etc.).

However, it will generally involve the system processor acting under the control of the operating system in accordance with standard techniques.

Once the trace unit 10 has been configured to contain a base address and a limit address, the base address is then copied into a third register 27, which is utilised to store a current address. In particular, register 27 is used to control the exact address in memory to which trace unit 10 outputs data at any given time.

Attached to register 27 is incrementor 30. This increases the value in current address register 27 after each output from the trace unit 10, in accordance with the size of the previous output. (In the embodiment of FIG. 1 the output from record generator 40 is fixed in size, so current address 27 is always incremented by a set amount, but other embodiments may support a variable size output). Incrementing the current address after each output ensures that the next output is written to a fresh memory address, rather than overwriting earlier output from trace unit 10. Note that the operation of incrementor 30 is triggered by a signal from recogniser 35, as described in more detail below.

Also shown within FIG. 1 is comparator 32. This checks that the current address in register 27 does not exceed the limit address in register 25, in other words that the trace unit 10 is still directing data to the region of memory that has been allocated to it. As long as this is indeed the case, the comparator 32 will send an enable signal into a recogniser 35. However, if the current address has been incremented to such an extent that it is no longer within the region of memory allocated to trace unit 10, then this will be detected by comparator 32, which as a result will stop sending a positive enable signal to the recogniser 35.

In addition, in this embodiment, the comparator 32 will also respond to the current address reaching the limit address 25 by generating an interrupt (not shown in FIG. 1). This is sent to the monitor and control system 105 and can serve as a request for additional space in memory to be allocated to the trace unit. This allocation can be made by simply increasing the limit address 25 if a contiguous region of memory is available, or by resetting both the base address 23 and limit address 25 to a different (vacant) portion of memory.

Also shown in FIG. 1 is an enable unit 21, which can be written to and read from by the monitor and control system 105. The purpose of enable unit 21 is to allow the monitor and control system to selectively turn on and off the monitoring operations at trace unit 10 by setting the state of enable unit 21 accordingly.

Recogniser 35 listens to data, more specifically to trigger information 101, received from some external location. Recogniser 35 acts substantially as a comparator in that it compares incoming trigger information 101 against predefined criteria or data to see if there is a match.

Recogniser 35 also receives two enablement signals, one from comparator 32 as previously described, and one from enable unit 21. When recogniser 35 receives trigger information 101 that matches its predefined criteria, and assuming that the two enablement signals are both positive, it sends out a trigger signal which is directed to incrementor 30 and record generator 40.

Record generator 40 receives the trigger signal from recogniser 35. It also receives additional information 102, typically from the same external source as the trigger information going into recogniser 35. In response to the trigger command from the recogniser 35, the record generator uses this additional information 102 to produce a trace data record 100. This is output along the data line shown in FIG. 1 for storage in system memory at the address specified by current address register 27. This address will have been updated by incrementor 30 in response to the same trigger signal that caused the output record to be produced, and so will now specify the next vacant location in memory. It will be appreciated that the resultant ordering of the output records in memory will correspond to the sequence in which they were generated by the trace unit 10, which helps to simplify subsequent analysis.

In the embodiment of FIG. 1, the trace record output by the record generator 40 comprises two parts. The first part is simply a fixed identifier for trace unit 10. This allows a person or tool subsequently processing the trace information within memory to determine the source of the trace information. This is particularly valuable in systems that include multiple trace units.

The second part of the trace record generally comprises the additional information received by record generator 40. This may or may not be subject to further processing within the record generator unit itself. Such further processing may be used to extract or derive parameters of interest from the additional information 102. Alternatively it may also effectively take the form of a further trigger criteria (in other words, only output a data record if the additional information itself satisfies certain conditions).

If no such additional processing is required, then the internal structure of record generator 40 can be quite straightforward. For example, in the embodiment of FIG. 1 it contains a register for storing the fixed trace unit identifier, a buffer for temporarily storing the additional information 102, and an output unit which combines these into an output record when a trigger signal is received from recogniser 35.

A further possibility for the record generator 40 is that it acquires a timing signal, either internally generated or from some external source (possibly separate from the origin of the additional information 102). The current value of the timing signal could then be added to each output data record 100.

It will be appreciated that the trace unit structure depicted in FIG. 1 is exemplary only, and that there are many possible modifications and variations. As one example, the base address register 23 could be omitted, and the relevant information written directly into the current address register 27. Another option is that it could be the responsibility of incrementor 30 to check that the current address in register 27 does not exceed the limit address of register 25. If this situation were to occur, incrementor 30 could then perform an alert and/or interrupt similar to that described above for the comparator 32 (which could consequently be omitted).

Another possible modification would be for the enablement signal from the comparator 32 (or incrementor 30) to be sent to the enable unit 21. This could then be combined using the logical AND function with the signal from or set by the monitor and control system 105, to generate a single overall enablement signal into recogniser 35. A further possibility would be for one or both of the individual enablement signals received by recogniser 35 (or the combination thereof) to be directed instead to record generator 40. For example, record generator 40 could receive enablement signals from comparator 32 and enablement unit 21, as well as a trigger signal from recogniser 35. In this case, record generator 40 would only generate a record output if all three of the incoming signals were positive (and would most conveniently be responsible itself for triggering incrementor 30).

Note that FIG. 1 shows recogniser 35 and record generator 40 as having fixed functionality. However, in an alternative embodiment it may be possible for the monitor and control system 105 and/or some other external program or utility to configure one or both of them (similar to the base address and limit address registers of FIG. 1). One possibility would be to allow the trigger criteria of the recogniser 35 to be modified. For example, recogniser 35 could be set to trigger on access to a target range of memory addresses, as defined by upper and lower address values. This trigger condition could then be made configurable in a relatively straightforward manner by providing an update mechanism for these upper and lower address values.

Similarly as regards record generator 40, it may be for example that the additional information contains multiple fields. Only a subset of these fields may be of interest at a particular time, or possibly the record generator 40 may simply not have the capacity or bandwidth to output a record containing all the fields for any single event of interest. In this case, record generator 40 could potentially be configured by the monitor and control system or other appropriate mechanism to output only a particular field of interest. In other words in a first configuration, the output record from generator 40 will include one particular field from the additional information, while in a second configuration the output record might comprise a different field.

Although in one particular embodiment, trigger information 101 and additional information 102 are obtained from the same external source, each of these data flows could potentially be obtained from multiple (and possibly different) sources. Alternatively, in some embodiments there may be no additional information 102. For example, if the recogniser 35 looks for operations involving a target range of addresses, the trigger information would typically be the specific address that has been accessed. The identity of this specific address may in fact be all the information that needs to be included in output record 100. In this situation the trigger information 101 may be forwarded from the recogniser 35 into record generator 40, along with the trigger signal, or may be fed directly into record generator 40. Alternatively, in this situation the functionality of record generator 40 could easily be subsumed into recogniser 35, in which case the record generator itself would not be needed.

The form of output data from record generator 40 may also vary from one embodiment to another. For example, the first part of the record comprising the fixed identifier of the trace unit might be omitted if the regions of memory allocated to a particular trace unit are well defined. In this case the source of any particular trace record can be determined from the region of memory in which it is stored. An alternative approach would be for the monitoring and control system 105 to write some trace unit identifier information into memory immediately before the base address. This would then tie the following diagnostic records to the relevant trace unit without the need for each record to specifically contain the trace unit identifier.

Thus it will be appreciated that the structure and operation of trace unit 10 is subject to many possible modifications. Some implementations may be significantly more complex than the embodiment of FIG. 1 and able to provide highly sophisticated diagnostic information. Nevertheless, the embodiment of FIG. 1 has the advantage of being comparatively lightweight, since it comprises only simple components such as registers, a comparator, and so on. This in turn allows it to be easily and cheaply added to hardware, with minimal impact on system performance.

Indeed, given that modem processors typically contain between 20 and 100 million individual transistors, it will be appreciated that it is quite feasible to add more than one trace unit into a processor for investigative purposes. Thus it is envisaged that in a typical development context, between 10 and 100 (or more) such units might be employed on a single processor chip. These could be retained if desired on production versions of the chip for diagnostic and tuning purposes. For example, all the trace units could be included in early production versions, and then selectively omitted from subsequent production versions (particularly if it were intended to re-use the space for some other purpose).

Note that the simultaneous operation of a sufficiently large number of trace units may start to have a noticeable (adverse) impact on overall system performance, for example by occupying cache space in memory as described in more detail below. However, this can be controlled by selective use of the enablement facility 21. Thus if a particular problems arises or is suspected, only those traces units that output diagnostic information relevant to this problem need to be enabled, while the remainder can be disabled. It will be appreciated that such a disabled trace unit is entirely passive, and so should have negligible impact on the rest of the system. This is especially important in a production environment. Consequently, it may be that trace units in production systems are, by default, disabled by the operating system, and only activated if or when a particular need arises for diagnostic information.

Another possibility is that some or all of the trace units are removed completely from production systems, and only added back in if specifically required. It will be appreciated that the ease with which this may be accomplished will depend on the particular hardware implementation. For example, it is more awkward to remove/replace an on-chip trace unit that one formed as a separate device (compare the configurations of FIGS. 2 and 4 below).

Figure 2:
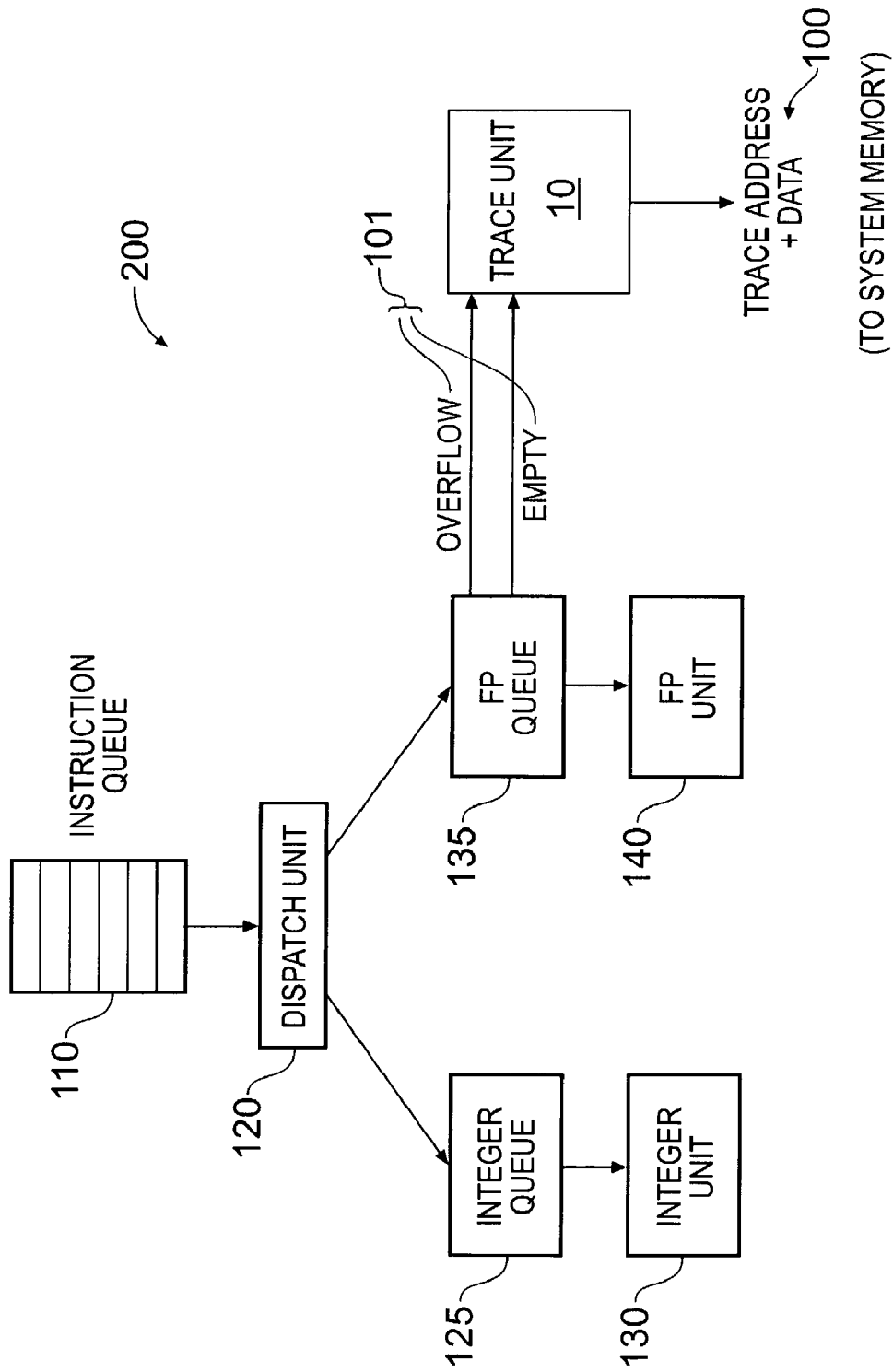
FIG. 2 illustrates the utilisation of the trace unit of FIG. 1 to monitor an instruction queue.

FIG. 2 illustrates the utilisation of trace unit 10 within a processor 200. More particularly FIG. 2 shows trace unit 10 providing diagnostic information about the instruction handling within processor 200. (It will be appreciated of course that processor 200 will typically contain many other components not relevant to this activity, and for clarity these have been omitted from FIG. 2).

Thus instructions for execution by processor 200 are received into instruction queue 110. In modem processors these are typically pre-fetched some time before execution is actually due to occur, thereby avoiding delays where the processor has to wait for an instruction to be accessed from memory. Instructions are removed from instruction queue 110 by dispatch unit 120, which directs instructions to one of two queues, depending on the nature of the particular instruction. Thus processor 200 maintains an integer queue 125 and a floating-point queue 135. Each of these stores instructions for a corresponding processing unit, namely integer unit 130 and floating-point unit 140 respectively. The operation of instruction handling and processing in a typical processor unit is well known and so will not be described further.

Of particular interest for present purposes is the provision within processor 200 of trace unit 10. In the illustrated embodiment, the trace unit provides diagnostics on the operation of the floating-point queue 135, for example, to determine the efficiency of the instruction prefetch facility. Note that the individual components within trace unit 10 can be substantially as described in relation to FIG. 1, and so they are not repeated within FIG. 2.

FIG. 2 depicts two arrows from floating-point queue 135 to trace unit 10. The combination of these two arrows represents the trigger information 101 that is being supplied into the recogniser of trace unit 10. In particular the recogniser receives an indication whenever the floating-point queue 135 overflows or empties. These two inputs are effectively combined using a logical OR operation, so that in either eventuality (empty or overflow), the recogniser of trace unit 10 generates a trigger command, which in turn will lead to the output of a trace record 100. It will be appreciated that where trigger information 101 does comprise multiple inputs, these can be combined with any desired (and potentially configurable) logic.

There are various mechanisms whereby information about the status of the floating-point queue 135 can be made available to trace unit 10. For example, one possibility is simply to modify floating-point queue 135 so that it has special outputs for providing this information to trace unit 10.

Alternatively, trace unit 10 may tap into or eavesdrop on existing outputs from floating-point queue 135. Thus floating-point queue 135 will typically have a line back to dispatch unit 120 which indicates its overflow status. In other words if this line is set, then the floating-point queue is full, and so the dispatch unit should not send any further instructions to the floating-point queue 135. Similarly there may be a line from floating-point queue 135 to floating-point unit 140 indicating that the floating-point queue is now empty and accordingly unable to provide any further instructions to floating-point unit 140.

It will be appreciated that the operation of these lines can either be as a preventative warning or as an error feedback mechanism. More particularly, the empty status can either trigger as soon as floating-point queue 135 is emptied, or only in response to a request from floating-point unit 140 that cannot be satisfied because there are no instructions currently in floating-point queue 135. Similarly the line status back to dispatch unit 120 can either be used to indicate that the floating-point queue 135 is full, or it can be used to indicate that an overflow error has occurred (i.e. the queue is already full and the dispatch unit has just tried to send an additional instruction to the floating-point queue 135 which cannot be accommodated).

Irrespective of the precise details of signals between the floating-point queue 135, dispatch unit 120 and floating-point unit 140, trace unit 10 can tap into the information on these lines to obtain trigger information 101. Trace unit 10 will then trigger whenever an overflow or empty signal is detected on one of these lines (obviously it is not feasible to receive both at the same time).

As previously mentioned, in some embodiments the precise triggering criteria may be configurable. Thus in the embodiment of FIG. 2, it may for example be possible to set the recogniser in trace unit 10 so that it ignores empty signals and only generates records for overflow signals (the converse setting might also be available). In this manner, the output of trace unit 10 can be adjusted to provide the particular diagnostic information of interest to a user at any given time.

FIG. 2 does not show the collection of additional information 102 by trace unit 10, but again there are a variety of options. One possibility is that the record generator 40 does not actually acquire any further information from floating-point queue 135. Rather it may simply record the fact that an overflow or empty event has occurred (and specify which). A further possibility is that the additional information 102 comprises some timing data which is derived from a clock signal (not shown in FIG. 2) and then added to the output records. In either situation it would be relatively straightforward to combine the function of the record generator and recogniser into a single unit.

The type of additional information acquired and/or stored may also vary according to the type of trigger signal. For example, the trace output record for an overflow event may indicate the instruction sequence number of the instruction that overflowed the queue. The floating-point queue 135 could be modified to provide this information, or as before, it may be accessible through eavesdropping on communications between the dispatch unit and floating-point queue. However, there may be no such additional information 102 required in relation to an empty trigger event, or alternatively some different diagnostic information may be required for an empty event—for example, the number of entries currently in the instruction queue 110. This might be retrieved most conveniently from the instruction queue 110 itself. This illustrates the point discussed above that there is no particular requirement that the trigger information 101 and the additional information 102 come from the same source(s) or component(s).

As illustrated schematically in FIGS. 1 and 2, the diagnostic information 100 from trace unit 10 is output to system memory. This has several important benefits. Firstly it avoids the need for any dedicated memory capacity within trace unit 10 itself. In addition, since modem systems now have a physical memory of typically hundreds of megabytes (and frequently much more), a large amount of trace information can be accommodated. In addition, standard memory operations will lead in due course to trace information being saved from main memory out to non-volatile storage on an external disk or other such device, a facility that is much harder to provide internally within trace unit 10. Furthermore, trace information written to memory is readily available to diagnostic programs running on the computer system, and so can be easily analysed, potentially even in real time. Another important advantage when multiple trace units are present is that the diagnostic data from all the different units is output to a single device (i.e. system memory). This provides improved manageability, and enables a single interface to be provided for diagnostic purposes.

Figure 3:
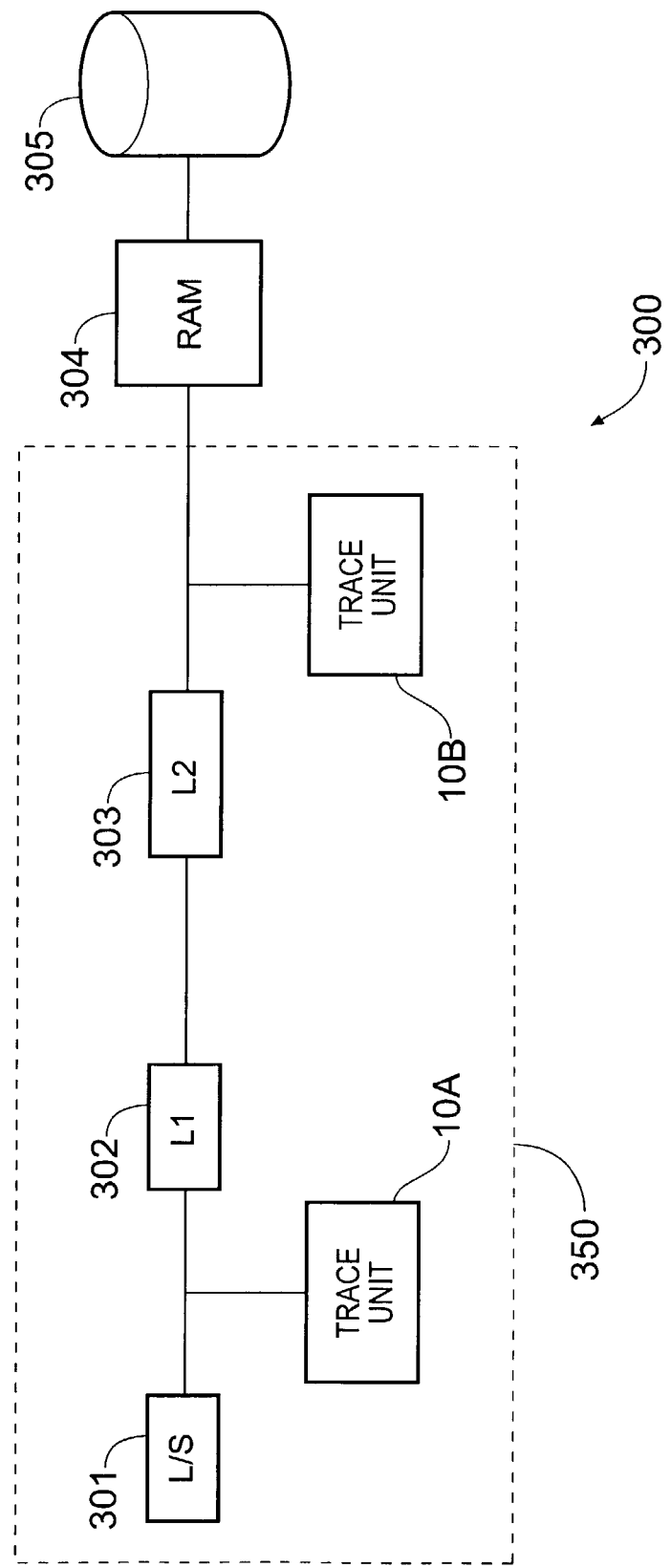
FIG. 3 illustrates a mechanism whereby the trace unit of FIG. 1 outputs trace information to system memory in one particular embodiment.

FIG. 3 illustrates a memory hierarchy 300, including load/store (L/S) unit 301 as used within a processor. This is linked to a level 1 (L1) cache 302, which is typically also on the same chip as processor and load/store unit 301. Next there comes the level 2 (L2) cache 303, and then system memory or RAM 304, which represents the main physical memory of the device. Finally, the system is provided with external storage such as disk drive 305 to provide non-volatile storage. Typically the L/S unit 301, the L1 cache 302, and the L2 cache 303 are all physically located on the processor (outlined by dashed line 350), although in some embodiments the L2 cache may be on a separate semiconductor device.

Processor 350 and RAM 304 form the core of a computer system, but many other components will normally be present, such as read only memory (ROM), input/output devices (display screen, keyboard, mouse, etc.), network adapters (e.g. for a LAN connection), and so on. The skilled person will be aware of a wide variety of possible configurations, including multiprocessor and distributed architectures. FIG. 3 does not illustrate these additional components of a computer system, since they are not directly relevant to an understanding of the present invention.

Software for execution by the system, in particular the operating system and any application programs, is loaded into processor 350. The software can originate from a variety of sources, such as a CD-ROM, DVD or tape, or be supplied over a network. Frequently, although not always, the software is stored on disk 305 prior to execution. Programs may also be preloaded onto the disk at manufacture. The software (plus any necessary input data) is then passed down memory hierarchy to processor 350 for execution. In addition, a certain amount of code for specialised tasks, such as to control system start-up, may be stored in devices such as semiconductor ROMs. The results from execution of the programs are then passed back down the memory hierarchy 300 for storage or network transmission as desired. Note that the operation of the chain of L/S unit 301, L1 cache 302, L2 cache 303, RAM 304, and disk drive 305 is well known in the art, and so will not be described further.

FIG. 3 also illustrates two trace units 10A, 10B. The trace units could be configured to monitor the operation of the memory hierarchy 300 itself, or some other system activity (such as in FIG. 2). In either case, trace units 10A and 10B will utilise the memory chain 300 to output trace data records to system memory. The precise manner in which this is accomplished will vary according to the location of the connection to the memory hierarchy 300. This in turn will generally depend on the particular aspect of operation being monitored by the trace unit (e.g. whether it is internal to the processor, whether it is part of the memory hierarchy itself, whether it is some external bus or component, etc.).

For example, the trace unit of FIG. 2 is constructed as part of the processor chip, and so can most conveniently engage the memory hierarchy on either side of the L1 cache 302. Alternatively, the trace unit described in connection with FIG. 4 below is able to perform direct memory transfers into RAM 304, and so corresponds to the positioning of trace unit 10B.

A certain amount of care is necessary to ensure that the outputs from the trace units do not interfere with the proper operation of memory hierarchy 300, particularly if the trace records are inserted near the start of the chain (i.e. near L/S unit 301). For example, as shown in FIG. 3, the L1 cache must now be able to accept data from multiple sources (L/S unit 301 and trace unit 10A). In addition, trace records from trace unit 10A must be kept small, so that they do not occupy too much of L1 cache 301. Otherwise performance may be degraded if data needed by L/S unit 301 has to be moved out of cache to accommodate the trace output.

It some embodiments it may be easier to write out trace information directly into the L2 cache rather than the L1 cache. Firstly, the L2 cache is significantly larger, and so the proportion of space occupied by the trace data will be smaller. Secondly, in some known systems with multiple processing cores, there are multiple corresponding L1 caches, or many systems have separate L1 caches for instructions and data. In such circumstances, the L2 cache is then already designed to cope with data outputs from multiple sources.

As previously mentioned, one advantage of inserting data into memory chain 300 is that standard memory operations are then used to move this down the chain to permanent storage, without further involvement of trace unit 10A or 10B. In addition, the trace data becomes available for standard diagnostic programs to manipulate or analyse, since these can readily access system memory.

Note that in one particular embodiment, trace records from trace units 10 are marked with a special purpose identifier when they are transferred onto the memory hierarchy 300. The reason for this is that if there is a trace unit monitoring the operation of memory hierarchy 300 (such as possibly trace unit 10A or 10B), it may not be desirable for this to pick up operations representing the storage of diagnostic records from other trace units (since this would represent the tracing of trace data). In this case the trigger criteria for the trace unit monitoring memory operations can be set to discard anything containing this special purpose identifier.

The configuration of FIG. 3 can also be utilised in an alternative embodiment for the trace units, which is particularly suited to the circumstance where there are multiple trace units on a single processor. In this embodiment, the individual trace units do not themselves directly control the final output memory location of the diagnostic trace units. More particularly, trace unit 10A is modified so that the limit address register 25, the current address register 27, the incrementor 30 and the comparator 32 (as shown in FIG. 1) are all omitted. Consequently the output from trace unit 10A is always directed to the same output address, which could be stored in base address register 23. In this embodiment, processor 350 then contains multiple trace units (not shown in FIG. 3), having the same structure as trace unit 10A. These could be configured to all write to their own unique address by initially setting an appropriate value for the base address.

In this alternative embodiment, the operation of trace unit 10B then becomes somewhat different from that of the other trace units such as trace unit 10A. Thus trace unit 10B intercepts output to the base addresses assigned to trace unit 10A and the other trace units, and redirects it to a suitable output location. In this embodiment one can view trace units 10A and 10B as a single distributed trace unit. Thus trace unit 10A can be regarded as a data generation portion that monitors the computer system and generates an output record of diagnostic information, while trace unit 10B can be regarded as a data record portion that maintains address information about where in memory the diagnostic information is to be stored, and then routes the output records accordingly.

Alternatively, trace unit 10B can be regarded as a complete trace unit in its own right, since it effectively monitors memory operations and triggers on outputs to particular addresses (corresponding to the base address allocated to trace unit 10A and any other associated trace units). Trace unit 10B then generates records containing these outputs that it directs to its own allocated memory location, which is incremented as described in relation to FIG. 1.

The approach of this alternative embodiment has several advantages. Firstly, the majority of trace units are simplified, since apart from unit 10B they only need to maintain a single output address, without the need to increment this or to range check. Secondly, all the trace information from the different units is written to a single region of memory (the region that is allocated to trace unit 10B). This is more efficient in terms of storage space than allocating each trace unit its own individual region of memory, which may end up only being partially occupied. Furthermore, the initial configuration process for the monitor and control program is simplified, since only one portion of memory needs to be allocated (plus appropriate base addresses). It is also easier for a diagnostic program to access and to process the stored data, since this is now available at a single location, and is ordered according to the absolute timing of records or events from the various source trace units 10A (ignoring any propagation or transmission delays).

Note that although having trace unit 10A write an output to a predetermined address which can then be detected and redirected by trace unit 10B provides a convenient communication path between the two, other mechanisms are also possible. For example, a direct link could be provided between trace unit 10A and trace unit 10B independent of the memory hierarchy 300. In this case trace unit 10A would output its records directly to trace unit 10B, which would then route them to main memory. Of course, different trace units within processor 350 could adopt different forms of connection to trace unit 10B, as best suited to the particular circumstances of any given trace unit.

Assigning each trace unit 10A its own base address provides a convenient mechanism for trace unit 10B to identify firstly that a given output is indeed a trace record, and secondly the particular trace unit from which it originated. However, the skilled person will be aware of possible alternative approaches. For example, all trace units 10A could be allocated a single base address, and their output records then include a separate source identifier of the originating trace unit (one danger with this approach is that records from different trace units may possibly collide with one another in a cache). Of course, if there is a direct link from trace unit 10A to trace unit 10B, then records from trace unit 10A may simply contain this source identifier, without the need for any base address.

Although for this alternative embodiment FIG. 3 illustrates a single data generation portion (trace unit 10A) and a single data record portion (trace unit 10B), it will be appreciated that there may be more than one data generation portion and more than one data record portion, and multiple data generation portions can share a single data record portion. The exact configuration adopted will depend on what is most effective and convenient given the layout of the particular system. As example, there may be data record portions at various locations around a semiconductor device, and each of these serves those data generation portions which are sited in its vicinity or that can be efficiently connected to it.

It will also be appreciated that although the alternative embodiment is illustrated in FIG. 3 in the context of a single processor, it can also be applied to other system components (or across multiple system components). Thus one possibility would be to have various data generation portions on one or more processors, and the data record portion (or portions) external to the processor, for example attached to a system bus.

Figure 4:
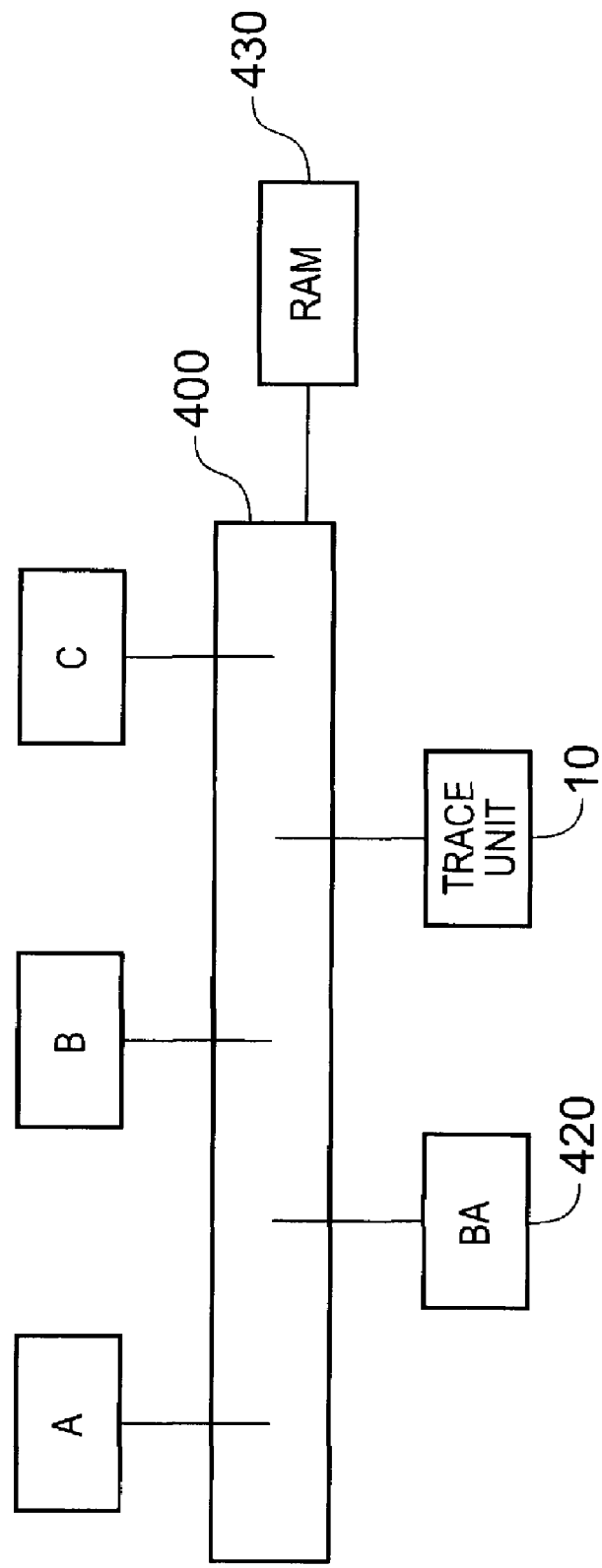
FIG. 4 illustrates an alternative utilisation of the trace unit of FIG. 1 for the purpose of monitoring bus communications.

FIG. 4 illustrates another alternative embodiment, in which the trace unit of FIG. 1 is attached to a bus 400 that connects system devices A, B and C. Bus 400 could be a PCI bus or any other known form of industry bus. Similarly, each of components A, B and C may be any known form of system device, such as processor, disk drive controller, network connection and so on. The exact configuration and nature of bus and the attached devices will depend on the particular system configuration.

FIG. 4 also shows a bus arbiter 420 attached to bus 400. The purpose of bus arbiter 420 is to control or arbitrate for access to bus 400. In particular when one of the devices A, B, C attached to bus 400 wishes to gain access to the bus for data transmission, the device requests ownership of the bus from bus arbiter 420. Bus arbiter 420 can then allocate ownership of the bus to the requesting device or can respond indicating that the bus is not currently available.

(It will be appreciated that not all known forms of bus use a bus arbiter for control purposes. For example an Ethernet uses a collision detection mechanism whereby devices attached to the Ethernet will start transmission at any time, and then back off if a collision with another transmission is detected. Such an approach removes the need for a bus arbiter. The present invention is equally applicable whether or not bus 400 is controlled by a bus arbiter).

Also linked to bus 400 is trace unit 10. This will typically have the structure previously described in relation to FIG. 1, supplemented by an appropriate bus interface device. Trace unit 10 in FIG. 4 can be used to monitor events within devices such as A, B or C, and/or information flowing between such devices along bus 400. It will be appreciated that the trace unit 10 of FIG. 4 can be readily removed from the system by simply disconnecting it from the bus 400. Of course, it could also be subsequently reconnected if so desired.

Assuming now for the purposes of illustration that the configuration of FIG. 4 is aimed at monitoring communications to target device C, the trace unit 10 eavesdrops on information flowing across bus 400 in order to pick up any communications that are intended for device C. However, trace unit 10 does not tamper with such communications or otherwise prevent them from being successfully received by device C. Consequently device C can be unaware of the presence of trace unit 10, and can operate quite normally, as if the trace unit 10 were not present.

Trace unit 10 identifies communications for device C based on their target address on bus 400. Thus in this context, the target address represents the trigger information 101 for trace unit 10. Note that there may be additional trigger criteria, for example, only communications from a particular source address or only a certain type of communication may be of interest to trace unit 10.

After trace unit 10 has received the appropriate trigger information, it extracts the additional information 102 (if any) required to generate an output record. This additional information may be available from the communications on bus 400 (for example the source or contents of the message that generated the trigger). Alternatively, the additional information may perhaps represent some internal state of a device. In this case the additional information might be retrievable by the trace unit from the relevant device by sending an appropriate request over bus 400, or some other link might be employed (not shown in FIG. 4).

Once trace unit 10 has generated the trace information 100, this is output to system memory for subsequent diagnostic purposes. In the configuration of FIG. 4, this can be achieved using a direct memory access (DMA) transfer to write data into system memory (depicted in FIG. 4 as RAM 430). In such a DMA transfer, the trace unit acquires ownership of the bus 400, just like any other device, thereby allowing data to be written directly into memory. Note that as described in relation to FIG. 1, the operating system will have already allocated a particular address range within system memory for the trace unit to use for this purpose. This ensures that the DMA transfer from trace unit 10 does not overwrite any other information in system memory 430 which is owned or being used by another device.

In summary, a flexible and lightweight hardware trace unit has been disclosed for monitoring and providing diagnostic information about operations within a computer system. This could be used in many different contexts, for example within an instruction-fetch unit, in a dispatch unit, in a register renaming unit and so on. The trace unit can be sensitive to address information, data, and other information (such as user versus system operations, cacheable or non-cacheable operations, etc.). The diagnostic information is output from the trace unit and into main or system memory by any convenient route, such as by insertion into the path between L1 and L2 caches. Although various embodiments have been described based on the above approach, it will be appreciated that these are by way of example only, and the skilled person will be able to make further modifications and adaptations that remain within the scope of the claimed invention and its equivalents.

The invention claimed is:

1. A hardware trace unit integrated into a computer system having a main memory, said trace unit including:
a store containing information specifying an output location in main memory;
an input for monitoring the state and/or operation of said computer system;
a trigger unit for comparing data from the input against one or more trigger conditions; and
an output generator responsive to said one or more trigger conditions being satisfied to write diagnostic information to the main memory of the computer at the output location specified in the store;
wherein the diagnostic information includes an indicator showing that it has been generated by a trace unit and said trace unit is configured to ignore communications that include such an indicator.

2. The hardware trace unit of claim 1, wherein the store comprises a register for storing said location in main memory.

3. The hardware trace unit of claim 2, further including means for incrementing said register after each output to main memory.

4. The hardware trace unit of claim 1, wherein the initial value of said output location can be set by an operating system of the computer system.

5. The hardware trace unit of claim 1, wherein the writing of diagnostic information is disabled if said output location is outside a predetermined range.

6. The hardware trace unit of claim 5, wherein said predetermined range can be set by an operating system of the computer system.

7. The hardware trace unit of claim 1, further comprising means for allowing selective enablement and disablement of the trace unit.

8. The hardware trace unit of claim 1, wherein said output generator is attached to a path connected to a cache of the computer system.

9. The hardware trace unit of claim 1, wherein said output generator is attached to a bus for DMA transfer with said main memory.

10. The hardware trace unit of claim 1, wherein the diagnostic information further includes an identifier indicative of which trace unit of a plurality of trace units generated it.

11. The hardware trace unit of claim 1, wherein the input data comprises a first set of information for comparison against said one or more trigger conditions, and a second set of information which is used by the output generator to form said diagnostic information.

12. The hardware trace unit of claim 11, wherein the first set of information is received directly into the trigger unit, and the second set of information is received directly into the output generator.

13. The hardware trace unit of claim 1, wherein said one or more trigger conditions are configurable.

14. A hardware trace unit integrated into a computer system having a main memory, said trace unit including:
means for storing information specifying an output location in main memory;
input means for monitoring the state and/or operation of said computer system;
means for comparing data from the input means against one or more trigger conditions; and
means responsive to said one or more trigger conditions being satisfied for writing diagnostic information to the main memory of the computer at the output location specified in the means for storing;
wherein the diagnostic information includes an indicator showing that it has been generated by a trace unit and said trace unit is configured to ignore communications that include such an indicator.

15. A computer system including a main memory and two or more hardware trace units integrated into the computer system, each said trace unit including:
a store containing information specifying an output location in main memory;
an input for monitoring the state and/or operation of said computer system;
a trigger unit for comparing data from the input against one or more trigger conditions; and
an output generator responsive to said one or more trigger conditions being satisfied to write diagnostic information to the main memory of the computer at the output location specified in the store;
wherein the diagnostic information includes an indicator showing that it has been generated by a trace unit and each said trace unit is configured to ignore communications that include such an indicator.

16. The computer system of claim 15, further comprising a trace utility program for accessing and analysing the diagnostic information written to main memory.

17. A processor for use in a computer system including a main memory, the processor incorporating a trace unit including:
a store containing information specifying an output location in main memory;
an input for monitoring the state and/or operation of said computer system;
a trigger unit for comparing data from the input against one or more trigger conditions; and
an output generator responsive to said one or more trigger conditions being satisfied to write diagnostic information to the main memory of the computer at the output location specified in the store;
wherein the diagnostic information includes an indicator showing that it has been generated by a trace unit and said trace unit is configured to ignore communications that include such an indicator.

18. The processor of claim 17, wherein the processor includes multiple trace units.

19. A computer system including a main memory and a processor, the computer system including a distributed trace unit comprising a data generation portion and a data record portion, wherein:
the data generation portion includes an input for monitoring the state and/or operation of said computer system; a trigger unit for comparing data from the input against one or more trigger conditions; and an output generator responsive to said one or more trigger conditions being satisfied to send diagnostic information to the data record portion;
and the data record portion includes a store containing information specifying an output location in main memory; and an output for writing the diagnostic information sent by the data generation portion to the main memory of the computer at the output location specified in the store;
wherein the diagnostic information includes an indicator showing that it has been generated by a trace unit and said trace unit is configured to ignore communications that include such an indicator.

20. The computer system of claim 19, wherein said computer system includes multiple data generation portions and a single data record portion.

21. The computer system of claim 20, wherein the diagnostic information sent from an output generator to a data record portion includes an indicator of the data generator portion from which it originated.

22. The computer system of claim 21, wherein said indicator comprises the address to which the diagnostic information is sent from the data generator portion.

23. A processor for use in a computer system including a main memory, the processor including a distributed trace unit comprising a data generation portion and a data record portion, wherein:
the data generation portion includes an input for monitoring the state and/or operation of said computer system; a trigger unit for comparing data from the input against one or more trigger conditions; and an output generator responsive to said one or more trigger conditions being satisfied to send diagnostic information to the data record portion;
and the data record portion includes a store containing information specifying an output location in main memory; and an output for writing the diagnostic information sent by the data generation portion to the main memory of the computer at the output location specified in the store;
wherein the diagnostic information includes an indicator showing that it has been generated by a trace unit and said trace unit is configured to ignore communications that include such an indicator.

24. The processor of claim 23, wherein said processor includes multiple data generation portions and a single data record portion.

25. A method of obtaining diagnostic information for a computer system having a main memory from a hardware trace unit integrated into said computer system, said method comprising the steps of:
storing information specifying an output location in main memory;
monitoring the state and/or operation of said computer system;
comparing data received from the monitoring against one or more trigger conditions; and
responsive to said one or more trigger conditions being satisfied, writing diagnostic information to the main memory of the computer at the specified output location specified in the store;
wherein the diagnostic information includes an indicator showing that it has been generated by a trace unit and said trace unit is configured to ignore communications that include such an indicator.

26. The method of claim 25, wherein the information specifying an output location in main memory is stored in a register.

27. The method of claim 26, further including the step of incrementing said register after each output to main memory.

28. The method of claim 25, wherein the initial value of said output location can be set by an operating system of the computer system.

29. The method of claim 25, wherein the writing of diagnostic information is disabled if said output location is outside a predetermined range.

30. The method of claim 29, wherein said predetermined range can be set by an operating system of the computer system.

31. The method of claim 25, further comprising the step of allowing selective enablement and disablement of the trace unit.

32. The method of claim 25, wherein said trace unit is attached to a line connected to a cache of the computer system for writing to main memory.

33. The method of claim 25, wherein said trace unit is attached to a bus for DMA transfer with said main memory.

34. The method of claim 25, wherein the diagnostic information includes an identifier indicative of which trace unit of a plurality of trace units generated it.

35. The method of claim 25, wherein the data received by the monitoring comprises a first set of information for comparison against said one or more trigger conditions, and a second set of information which is used to form said diagnostic information.

36. The method of claim 25, wherein said one or more trigger conditions are configurable.

37. A method of obtaining diagnostic information on a processor for use in a computer system including a main memory, the processor incorporating a distributed trace unit comprising a data generation portion and a data record portion, the method comprising the steps of:
monitoring at the data generation portion the state and/or operation of said computer system;
comparing at the data generation portion data obtained by monitoring the state and/or operation of the computer system against one or more trigger conditions;
sending, responsive to said one or more trigger conditions being satisfied, diagnostic information to the data record portion;
storing within the data record portion an output location in main memory;
writing the diagnostic information sent by the data generation portion to the main memory of the computer at the output location specified in the store;
wherein the diagnostic information includes an indicator showing that it has been generated by a trace unit and said trace unit is configured to ignore communications that include such an indicator.

38. The method of claim 37, wherein said processor includes multiple data generation portions and a single data record portion.

39. The method of claim 38, wherein the diagnostic information sent from an output generator to a data record portion includes an indicator of the data generator portion from which it originated.

40. The method of claim 39, wherein said indicator comprises the address to which the diagnostic information is sent from the data generator portion.

41. A method of obtaining diagnostic information on a computer system including a processor and a main memory, the computer system incorporating a distributed trace unit comprising a data generation portion and a data record portion, the method comprising the steps of:
  monitoring at the data generation portion the state and/or operation of said computer system;
  comparing at the data generation portion data obtained by monitoring the state and/or operation of the computer system against one or more trigger conditions;
  sending, responsive to said one or more trigger conditions being satisfied, diagnostic information to the data record portion;
  storing within the data record portion an output location in main memory;
  writing the diagnostic information sent by the data generation portion to the main memory of the computer at the output location specified in the store;
  wherein the diagnostic information includes an indicator showing that it has been generated by a trace unit and said trace unit is configured to ignore communications that include such an indicator.

42. The method of claim 41, wherein said computer system includes multiple data generation portions and a single data record portion.

* * * * *